July 29, 1969   J. T. WOYTON   3,458,773
CURRENT NULL DETECTOR
Filed Dec. 2, 1966

INVENTOR.
JOSEPH T. WOYTON
BY *M. A. Hobby*
ATTORNEY

United States Patent Office 3,458,773
Patented July 29, 1969

3,458,773
CURRENT NULL DETECTOR
Joseph T. Woyton, Mishawaka, Ind., assignor, by mesne assignments, to The Reliance Electric and Engineering Company, a corporation of Ohio
Filed Dec. 2, 1966, Ser. No. 598,764
Int. Cl. H01h 47/32; H03k 5/20; H02j 1/04
U.S. Cl. 317—148.5                                9 Claims

ABSTRACT OF THE DISCLOSURE

A null detector and control system for a primary and secondary circuit containing separate generators for producing relatively variable currents, including a signal responsive means and a bi-directional circuit for the signal responsive means in which two transistors are used in parallel in the circuit. The circuit senses the null condition between the two generators independent of the absolute value or polarity of the relatively variable sources.

---

Figure 1:
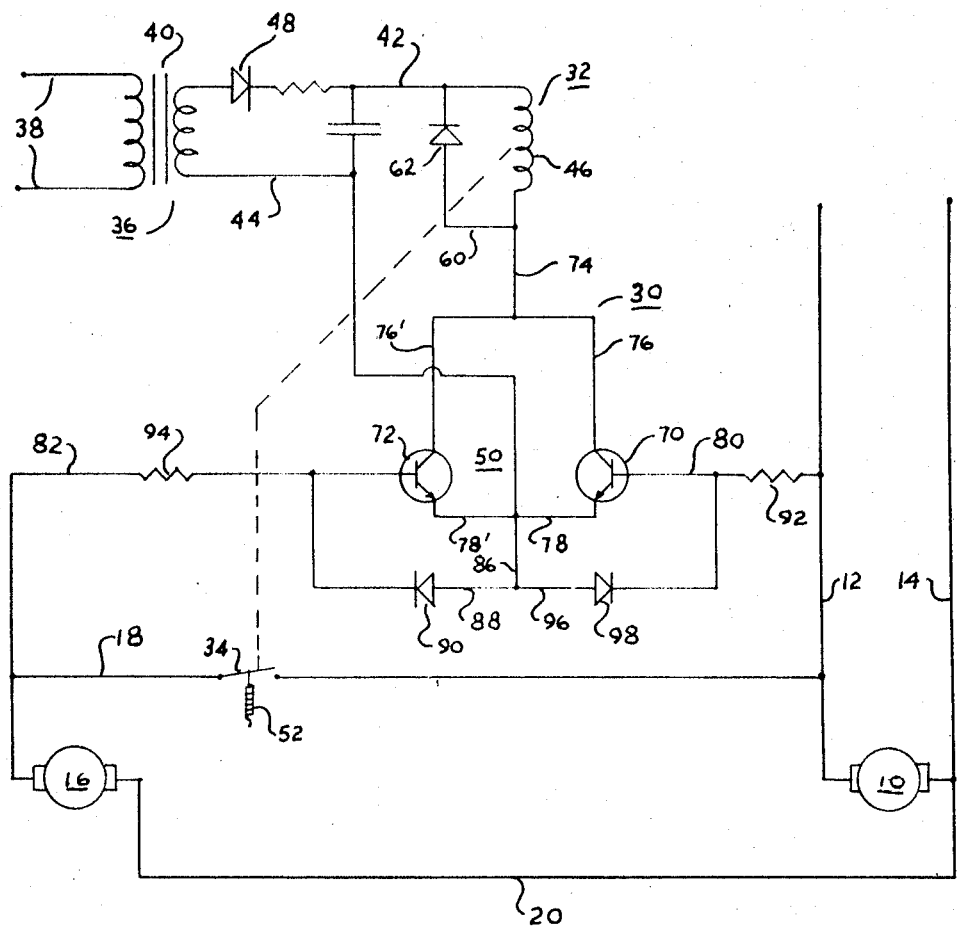

The present invention relates to a current null detector and more particularly to a system for detecting zero current between two points in an electrical circuit.

There are many applications in which a comparison is required between two sources of current to produce a signal or to indicate a condition, and in which the signal or indication is responsive to zero current between the two sources. These applications may involve sensing the relative speeds of two shafts or other rotating elements or the differential between two variable levels, weights or other conditions, using the current from two tachometers, rheostats or generators to produce the compared currents. For example, in electrical systems for supplying current to drive machinery or other driven equipment of varying loads, such as a dynamometer, a series of two or more generators is frequently used to provide the increased current to satisfy an increase in demand on the system. When each of the successive generators cuts in, it is important that there be no appreciable differential in output between the primary generator and the secondary generator lines. Various types of detectors have been used in the past to sense output differential and produce a signal which could be used by the operator in controlling the operation of the generators to obtain a zero differential condition before cutting in the second generator. These prior detector systems usually indicated a difference in output and, in response to the signal indicated thereby, the operator would regulate the system and cut in the second generator when the signal failed to show a differential in output between the primary and secondary generators.

The prior current null detectors were not only unreliable and often inaccurate, but required the operator to regulate and control the electrical system for the two generators, tachometers or the like, manually, and to cut in the second generator, or regulate a system within a relatively wide range near zero output differential, the operator often not knowing whether zero differential existed, or how great the differential was between the lines within the broad range. It is, therefore, one of the principal objects of the present invention to provide a relatively simple and highly reliable system for sensing zero output differential between two sources of current and for controlling one of the sources, or for performing an operation or function in response to the signal produced by a zero differential between the sources.

Another object is to provide a current null detector and circuit control device which is highly sensitive and accurate, and which has a very wide dynamic range and can be used in many applications involving two outputs or signals variable relative to one another in response to some preselected condition, such as speed, level or weight.

Still another object of the invention is to provide a system for controlling a relay in a multiple generator electrical power system, which positively holds the relay switch open when the differential in output between the two generators would be sufficient to prevent a smooth transition from the generator to two or more generators, and which is so constructed and arranged that the signal circuit or system fails safely, i.e., will not give a false signal or incorrect operation if the system fails or does not function properly.

Figure 2:
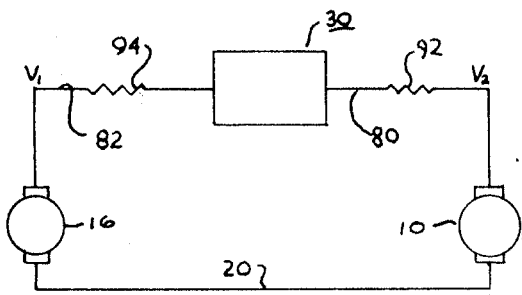

Further objects and advantages of the present invention will become apparent from the following description and accompanying drawing, wherein:

FIGURE 1 shows, for the purpose of illustrating the invention, a schematic diagram of a circuit for a dynamometer, having a primary and secondary generator and the present circuit connected thereto for controlling the sequential operation of the secondary generator, and FIGURE 2 shows a diagram of a basic two terminal network having the present detector incorporated therein.

Referring more specifically to the circuit illustrated in the diagram of FIGURE 1, numeral 10 designates a primary DC generator having power output lines 12 and 14 connected thereto and leading to a motor or series of motors to be driven by the current from the primary generator. The motor may be used to drive machinery and equipment of various types subjected to varying loads and power requirements. Numeral 16 designates a secondary DC generator which is adapted to augment the output of the primary generator and provide additional current when the load conditions on lines 12 and 14 reach a predetermined level such that the primary generator cannot handle the entire load. The secondary generator 16 is connected to lines 12 and 14 by lines 18 and 20. The two generators are driven by any suitable power source, and the primary generator normally operates independently of the secondary generator, which remains idle until the load demand for current is such that the primary generator can not adequately or safely handle the load alone.

One of the primary problems in a system where a series of generators is used to provide the current for a varying load, in which the generators are cut in sequentially in accordance with load requirements, is that the ouput of the secondary generator or generators in a series must be substantially the same as the output of the primary generator before the secondary generator or generators are cut into the line, in order to avoid a short or a shock and complete failure of the power system. While drawing illustrates only one secondary generator, a series of the secondary generators may be used to provide additional current as the load requirements increase, the generators of the series normally cutting in sequentially as the load increases. If additional generators are used, all of the secondary generators are connected either directly or indirectly to leads 12 and 14.

In order to avoid the adverse conditions, including a short or a shock, referred to in the preceding paragraph, when the secondary generators are to be cut in, a current differential detector and control is connected into the secondary output lines leading to output lines 12 and 14.

The control, generally indicated by numeral 30, includes a relay 32 having switch 34 in line 18 and a D.C. power source indicated by numeral 36, the D.C. power source being provided by the primary AC source 38 having a transformer 40 with output leads 42 and 44 connected to coil 46 of the relay and a rectifier 48 in lead 42. Lead 44 is connected to the coil through current sensing means indicated generally by numeral 50. In the control system of relay 32, switch 34 in line 18 is held open by the energized coil 46 and closed by a spring 52 so that when the coil is deenergized by the current sensing means 50, the switch 34 is automatically closed. A leadback circuit 60 having rectifier 62 is connected across relay coil 46 to deenergize the coil to provide a protective circuit when the coil is denergized.

The sensing means 50 consists of two transistors 70 and 72, each having its collector connected to the relay coil 46 by lead 74 and parallel leads 76 and 76', respectively, and each having its emitter connected to lead 44 by leads 78 and 78', respectively, thus completing the circuit from the transformer 40 through rectifier 48, coil 46 and to lead 44. The base of transistor 70 is connected to output line 12 by lead 80, and the base of transistor 72 is connected to output line 18 of the secondary generator by lead 82, and hence transistors 70 and 72 sense the output of the primary and secondary generators, respectively. The circuit for the base of transistor 70 is completed by leads 78, 86 and 88, rectifier 90, and lead 82 to the output of secondary generator 16, and the circuit for the base of transistor 72 is completed by leads 78', 86 and 96 and rectifier 98, and leads 80 to the output of the primary generator. Leads 80 and 82 both have current limiting resistors 92 and 94 for controlling the amount of current required for operating the respective transistors. When the output in line 12 is greater than the output in line 18, current flows through lead 80, transistor 70, leads 86 and 88, rectifier 90 and through lead 82, thus causing current to flow through transistor 70 and thereby completing the circuit for relay coil 46 which holds relay switch 34 in open position in opposition to spring 52; thus the primary generator continues to operate alone without the assistance of the output of the second generator. Likewise, if the output in line 18 is greater than the current in line 12, current flows through lead 82, transistor 72, leads 86 and 96, rectifier 98 and lead 80 to the output line 12 of the primary generator, thus activating transistor 72 and completing the circuit for coil 46. Current flows through transistor 70 or 72 at all times except when the output from the two generators is the same.

The broad concept of the present invention is illustrated by the following two terminal networks. The circuit threshold (S), or differential above which the circuit will function, is given by the following expression:

$$C = (V_1 - V_2) = 2V_{BE}$$

where:
$V_1$ and $V_2$ are the outputs being compared, $V_{BE}$ is the transistor pedestal.

This expression is applicable to the present system as shown in FIGURE 2.

In the operation of a system having primary and secondary generators cut in sequentially, the primary generator is placed in operation for supplying power to the motor of the driven equipment. As the demand on the primary generator increases to a predetermined point, the operator starts the secondary generator. As the current output increases, the operator cannot, with the present sensing and control system, inadvertently connect the second generator into the line until the output of the secondary generator has reached the output of the pirmary generator, thus eliminating the possibility of a short in or shock on the primary lines. At the time the secondary generator is inoperative or operating at an output less than the primary generator, current flows through lead 80, transistor 70, rectifier 90 and leads 88 and 82, thus causing transistor 70 to pass through coil 46. The energization of the coil opens switch 34 and prevents the current in line 12 from flowing to the secondary generator during the no or low output condition in the secondary generator. When the two generators are operating on the same output level, they can be connected into the output lines 12 and 14 safely. Under this condition the current from primary output line 12 through lead 80, transistor 70 and rectifier 90 ceases, thus terminating the flow of current from coil 46 through transistor 70 and de-energizing the coil, permitting spring 52 to close switch 34. If the output of the secondary generator should increase beyond the output of the primary generator, current flowing through lead 82, transistor 72 and rectifier 98 and leads 96 and 80 retains coil 46 in its energized condition, thereby holding switch 34 in open position. When the current reaching transistors 70 and 72 is equal, no current will flow through the transistors, thus de-energizing the coil 46. After the primary and secondary generators have been connected together in operation, the sensing means 50 and relay 32 are no longer required for continued operation of the power generating system.

It is seen that the present control system automatically prevents the secondary generator from cutting into the primary system until the output of the two generators is substantially equal, thus eliminating the hazard which normally has existed in regulating the systems in response to a signal merely indicating when the output of the two generators is unbalanced. In the event more than two secondary generators are in the system, a control system similar to the control 30 is used sequentially for each of the secondary generators. In order to avoid any possibility of switch 34 being accidentally closed should the control system 30 fail, a secondary circuit may be used having a solenoid which closes rather than opens the switch, this secondary circuit being controlled by control 30. In this fail-safe system, when coil 46 is deenergized, it opens the secondary circuit, thereby permitting a spring to open switch 34.

While only one embodiment of the present invention has been described in detail herein, various changes and modifications may be made to satisfy requirements.

I claim:

1. A current null detector and control system for a primary and a secondary circuit containing separate generators for producing relatively variable currents, with each circuit having two leads: said system comprising a signal responsive means, a bi-directional circuit for said means, two transistors in parallel in the circuit for said means, a lead connecting the base of one of said transistors to one of the leads of the primary circuit, a lead connecting the base of the other of said transistors to one of the leads of the secondary circuit, leads connecting the emitter of each transistor with the lead to the base of the opposite transistor, and rectifiers in each of said last recited leads for passing current to the respective base lead circuit when the current from said circuit is less than the current from the other of said circuits, thereby rendering the respective transistor operable to supply current to said signal responsive means.

2. A current null detector and control system as defined in claim 1 in which said signal responsive means includes a solenoid.

3. A current null detector and control system as defined in claim 1 in which said signal responsive means includes a relay having a switch in one of said circuits for controlling the latter circuit in response to a zero potential between the two circuits.

4. A current null detector and control system as defined in claim 1 in which the circuit for said signal responsive means is connected to an AC source and includes a transformer, a rectifier, and a coil energized therefrom.

5. A current null detector and control system as defined in claim 1 in which the leads to each of the two transistor bases contain current limiting resistors and in which said last recited leads are connected to the respective base leads between the resistor therein and the base.

6. A current null detector and control system as defined in claim 4 in which the leads to each of the two transistor bases contain current limiting resistors and in which said last recited leads are connected to the respective base leads between the resistor therein and the base.

7. A control system for a power supply circuit having a primary generator, power output lines connected to the generator, a secondary generator and lines connecting said secondary generator to said power output lines: said control system comprising a switch in one of the lines connecting said secondary generator to the respective power output line, a DC source, a coil for operating said switch, leads connecting said DC source to said coil, two transistors in parallel in one of the leads of said coil, a lead connecting the base of one of said transistors to the output of said primary generator, a lead connecting the base of the other of said transistors to the output of said secondary generator, and leads connecting the emitter of each transistor with the lead to the base of the opposite transistor, and rectifiers in each of said last recited leads for passing current to the opposite generator output lines.

8. A current null detector and control system as defined in claim 7 in which the leads to each of the two transistor bases contain current limiting resistors and in which said last recited leads are connected to the respective base leads between the resistor therein and the base.

9. A current null detector and control system as defined in claim 8 in which the circuit for said signal responsive means is connected to an AC source and includes a transformer, a rectifier, and a coil energized therefrom.

References Cited

UNITED STATES PATENTS 2,632,886   3/1953   Barney.
3,310,688   3/1967   Ditkofsky.

JOHN F. COUCH, Primary Examiner

DENNIS HARNISH, Assistant Examiner

U.S. Cl. X.R.

307—87, 235